United States Patent
Lonkar

(10) Patent No.: US 12,336,037 B2
(45) Date of Patent: Jun. 17, 2025

(54) SEAMLESS SESSION HANDLING WITH REDUNDANT DEPLOYMENT OF POLICY CONTROL NODES

(71) Applicant: T-Mobile USA, Inc., Bellevue, WA (US)

(72) Inventor: Shon Anil Lonkar, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 86 days.

(21) Appl. No.: 17/667,924

(22) Filed: Feb. 9, 2022

(65) Prior Publication Data

US 2023/0254925 A1    Aug. 10, 2023

(51) Int. Cl.
| | |
|---|---|
| *H04L 41/0894* | (2022.01) |
| *H04L 61/503* | (2022.01) |
| *H04L 65/1016* | (2022.01) |
| *H04L 65/1069* | (2022.01) |
| *H04W 60/00* | (2009.01) |
| *H04W 72/04* | (2023.01) |
| *H04W 76/18* | (2018.01) |
| *H04W 92/18* | (2009.01) |

(52) U.S. Cl.
CPC ......... *H04W 76/18* (2018.02); *H04L 65/1069* (2013.01); *H04W 92/18* (2013.01)

(58) Field of Classification Search
CPC . H04L 12/1407; H04L 41/0894; H04L 47/20; H04L 65/1069; H04W 72/53; H04M 15/56; H04M 15/8228

USPC .......................................... 370/252; 455/450
See application file for complete search history.

(56) References Cited

U.S. PATENT DOCUMENTS

| | | |
|---|---|---|
| 5,991,302 A | 11/1999 | Berl et al. |
| 6,937,566 B1 | 8/2005 | Forsloew |
| 6,938,080 B1 | 8/2005 | Kahveci et al. |
| 6,959,393 B2 | 10/2005 | Hollis et al. |
| 6,970,445 B2 | 11/2005 | Oneill et al. |
| 7,024,687 B2 | 4/2006 | Chaudhuri et al. |
| 7,082,130 B2 | 7/2006 | Borella et al. |
| 7,177,628 B2 | 2/2007 | Sommers et al. |

(Continued)

FOREIGN PATENT DOCUMENTS

| | | |
|---|---|---|
| CN | 107318158 A | 11/2017 |
| CN | 110708170 B | 3/2020 |

(Continued)

*Primary Examiner* — Marcus Smith
*Assistant Examiner* — Jason A Harley
(74) *Attorney, Agent, or Firm* — Perkins Coie LLP

(57) ABSTRACT

Systems, methods, and devices that relate to reducing or minimizing session establishment delay with redundant deployment of policy control nodes are disclosed. In one example aspect, a method for wireless communication includes receiving, by a first communication node configured to provide policy control in a communication network, a request for establishing a communication session with a mobile device. The method also includes determining, by the first communication node, that a failure has occurred between the first communication node and a second communication node for establishing the communication session, and transmitting, by the first communication node, a notification to a third communication node indicating information about the failure.

18 Claims, 10 Drawing Sheets

(56) References Cited

U.S. PATENT DOCUMENTS

| | | |
|---|---|---|
| 7,193,985 B1 | 3/2007 | Lewis et al. |
| 7,266,100 B2 | 9/2007 | Le et al. |
| 7,280,546 B1 | 10/2007 | Sharma et al. |
| 7,289,429 B2 | 10/2007 | Mo et al. |
| 7,295,511 B2 | 11/2007 | Sharma et al. |
| 7,301,935 B1 | 11/2007 | Chaturvedi et al. |
| 7,385,947 B2 | 6/2008 | Wu et al. |
| 7,599,374 B2 | 10/2009 | Poeyhoenen et al. |
| 7,664,861 B2 | 2/2010 | Guntupalli et al. |
| 7,706,373 B2 | 4/2010 | Xu et al. |
| 7,969,945 B2 | 6/2011 | Navali et al. |
| 7,983,242 B2 | 7/2011 | Nasielski et al. |
| 8,041,942 B2 | 10/2011 | Narayanan et al. |
| 8,248,915 B2 | 8/2012 | Baglin et al. |
| 8,248,916 B2 | 8/2012 | Baglin et al. |
| 8,290,819 B2 | 10/2012 | Bawcutt |
| 8,315,172 B2 | 11/2012 | Baglin et al. |
| 8,380,872 B2 | 2/2013 | Margolis et al. |
| 9,264,454 B2 | 2/2016 | Lidström et al. |
| 9,332,582 B2 | 5/2016 | Ulupinar et al. |
| 9,351,143 B2 | 5/2016 | Barany et al. |
| 9,706,340 B2 | 7/2017 | Kim et al. |
| 9,912,488 B2 | 3/2018 | Chastain |
| 9,998,569 B2 | 6/2018 | Roeland et al. |
| 10,021,533 B2 | 7/2018 | Chandramouli et al. |
| 10,129,689 B2 | 11/2018 | Kathuria et al. |
| 10,362,511 B2 | 7/2019 | Youn et al. |
| 11,089,519 B2 | 8/2021 | Hampel et al. |
| 2004/0148434 A1 | 7/2004 | Matsubara et al. |
| 2004/0170125 A1 | 9/2004 | Oneill |
| 2005/0010386 A1 | 1/2005 | Tharp et al. |
| 2006/0053290 A1 | 3/2006 | Randle et al. |
| 2006/0248337 A1 | 11/2006 | Koodli |
| 2007/0005971 A1 | 1/2007 | Leung et al. |
| 2007/0064886 A1 | 3/2007 | Chiu et al. |
| 2007/0070959 A1 | 3/2007 | Almeroth et al. |
| 2007/0198837 A1 | 8/2007 | Koodli et al. |
| 2007/0211694 A1 | 9/2007 | Rasanen |
| 2010/0260101 A1 | 10/2010 | Tsirtsis et al. |
| 2011/0023131 A1* | 1/2011 | Hjelm ............ H04L 67/51 726/29 |
| 2011/0202647 A1* | 8/2011 | Jin ............ H04L 69/40 709/223 |
| 2012/0170548 A1 | 7/2012 | Rajagopalan et al. |
| 2015/0046826 A1 | 2/2015 | Mann et al. |
| 2015/0236863 A1* | 8/2015 | Castro Castro ..... H04L 12/1407 370/259 |
| 2018/0110087 A1* | 4/2018 | Cai ............ H04W 76/38 |
| 2019/0149977 A1* | 5/2019 | Seenappa ........ H04L 41/40 370/331 |
| 2020/0044878 A1* | 2/2020 | Avasarala ........ H04L 65/1104 |
| 2021/0153002 A1* | 5/2021 | Zhou ............ H04W 48/18 |
| 2021/0211904 A1* | 7/2021 | Zong ............ H04W 8/08 |
| 2021/0352464 A1* | 11/2021 | Xu ............ H04W 60/04 |

FOREIGN PATENT DOCUMENTS

| | | |
|---|---|---|
| CN | 109714244 B | 2/2021 |
| CN | 110505356 B | 4/2021 |
| CN | 109714752 B | 9/2021 |
| EP | 1364296 A1 | 11/2003 |
| EP | 1684536 B1 | 4/2015 |
| JP | 2003018195 A | 1/2003 |

* cited by examiner

SEAMLESS SESSION HANDLING WITH REDUNDANT DEPLOYMENT OF POLICY CONTROL NODES

BACKGROUND

Mobile communication technologies are moving the world toward an increasingly connected and networked society. In both the Fourth-Generation (4G)/Long-Term Evolution (LTE) wireless communication technology and the Fifth-Generation (4G)/New Radio (NR) wireless communication technology, redundant deployment of the Policy and Charging Rules Function (PCRF) or the Policy Control Function (PCF) is used to provide non-disrupted message handling so as the minimize failures and improve user experience.

Figure 1A:
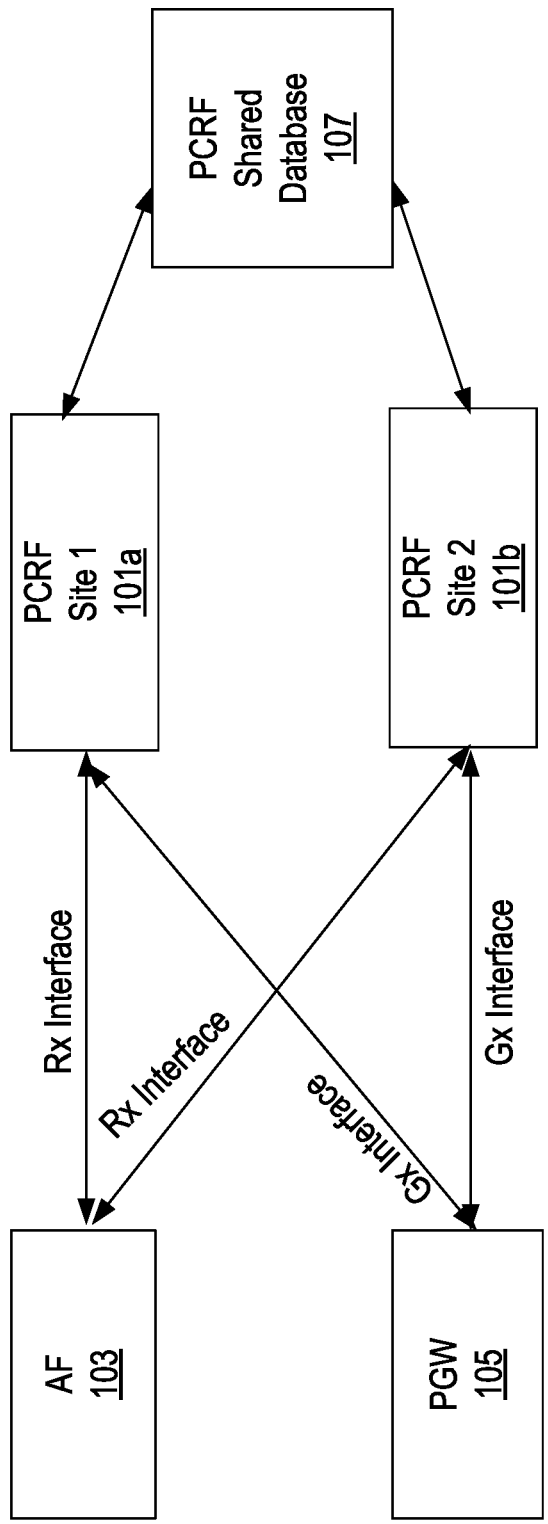
FIG. 1A illustrates an example redundant Policy and Charging Rules Function (PCRF) deployment in accordance with one or more embodiments of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Section headings are used in the present document only to improve readability and do not limit scope of the disclosed embodiments and techniques in each section to only that section. Certain features are described using examples of the Long-Term Evolution (LTE) and Fifth Generation (5G) wireless protocols. However, applicability of the disclosed techniques is not limited to only LTE/5G wireless systems.

Redundant deployment of the Policy and Charging Rules Function (PCRF) or the Policy Control Function (PCF) nodes has been used since the advancement of LTE wireless technology to improve reliability of the calls and to improve user experience. To minimize impact of network failures, a core network entity can have a communication link established with each of the redundantly deployed PCRF or PCF so that communication can continue. However, during the establishment of a call session with a user, when a failure (e.g., a link failure) occurs within a core network, the user is required to reinitiate the session due to a lack of communication between the core network entity and the PCRF/PCF nodes and between the PCRF/PCF nodes themselves, leading to excessive delays that impact user experience. This patent document discloses techniques that can be used to continue the session establishment using peer PCRF/PCF nodes in the redundant deployment without reinitiating the signaling sequences for session establishment, thereby reducing or eliminating the long delays cause by the failure(s).

In LTE communication networks, the PCRF provides policy control and flow-based charging control decisions. The PCRF operates at the core network and accesses subscriber databases and other specialized functions in a centralized manner. As an important component of the network, PCRF Server is often deployed using a distributed architecture in which the components are protected through a redundant deployment model. In many cases, an additional identical site is implemented to geographical (geo) redundancy so that, when a site fails, the PCRF can attempt the same operation on the next available site to provide a non-disrupted message handling. All the subscribers and service provisioning data are replicated between the sites. Each site is capable of handling the full required traffic capacity in case the remaining sites all encounter failures.

FIG. 1A illustrates an example redundant PCRF deployment in accordance with one or more embodiments of the present technology. As shown in FIG. 1A, two geo-redundant PCRF sites 101a, 101b are provided. Each of the PCRF site is connected with the Application Function (AF) 103 via the Rx Interface and with the Packet Data Network Gateway (PGW) 105 via the Gx Interface. The PCRF sites 101a, 101b are also connected to a shared database 107 configured to store the PCRF data.

Figure 1B:
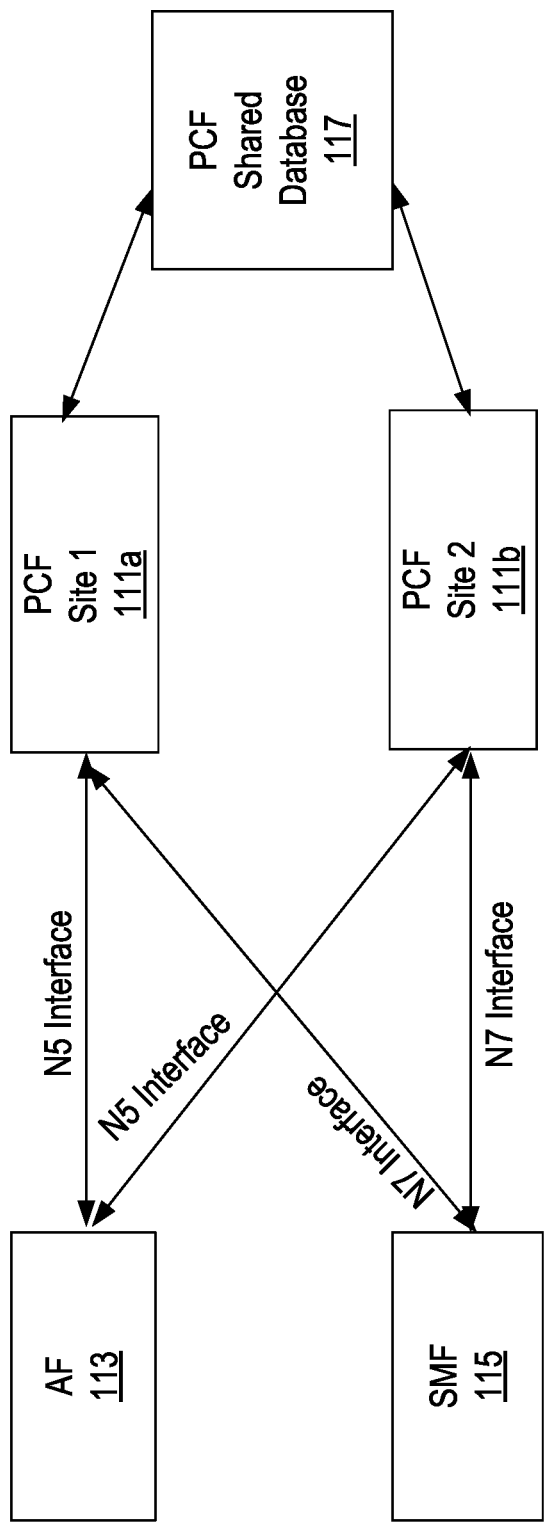
FIG. 1B illustrates an example redundant Policy Control Function (PCF) deployment in accordance with one or more embodiments of the present technology.

In the 5G communication networks, the PCRF has evolved to be the PCF, one of the control plane (CP) network functions (NF) of the 5G core network (5GC). FIG. 1B illustrates an example redundancy PCF deployment in accordance with one or more embodiments of the present technology. Two geo-redundant PCF sites 111a, 111b are provided. Each of the PCF site is connected with the Application Function (AF) 113 via the N5 Interface and with the Session Management Function (MSF) 105 via the N7 Interface. The PCF sites 111a, 111b are also connected to a shared database 117 configured to store the PCF data.

Figure 2:
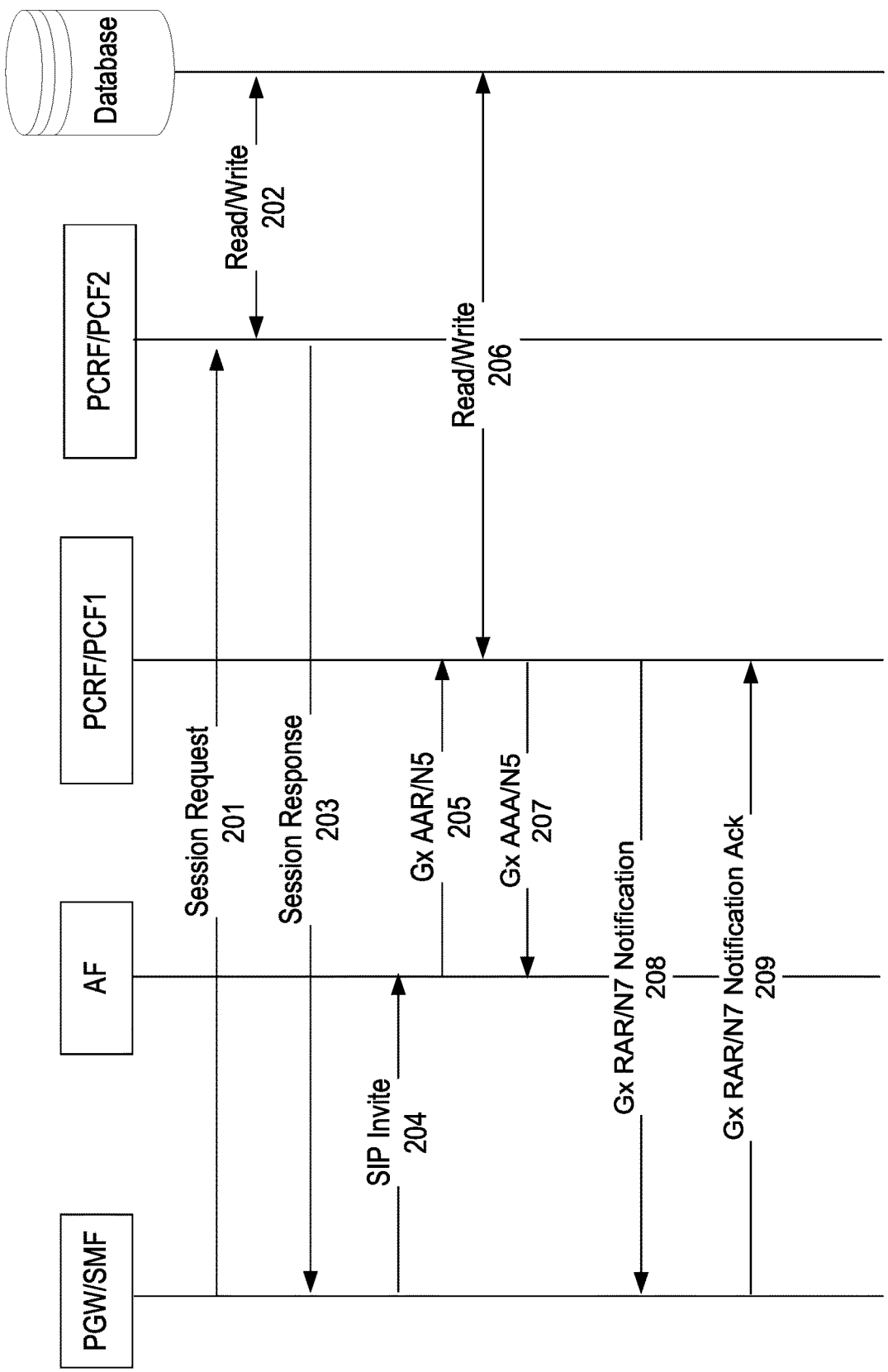
FIG. 2 Illustrates an example call flow using redundant deployment of the PCRF/PCF.

Using the distributed and redundant deployment of the PCRF/PCF, a call can be established and handled by one or more PCRF/PCF sites. FIG. 2 Illustrates an example call flow using redundant deployment of the PCRF/PCF. As shown in FIG. 2, the PWG/SMF transmits an initial request at operation 201 to one of the PCRF/PCF sites (e.g., PCRF/PCF2) to establish a call session. The PCRF/PCF2 site accesses the database at operation 202 to perform necessary date reads and writes. The PCRF/PCF2 transmits a session response at operation 203 to the PGW/SMF, thereby establishing a default session bearer for the call. The PGW/SMF then sends a Session Initiation Protocol (SIP) invite message to the AF at operation 204, requesting the establishment of the call session.

In the LTE networks, the AF opens an Rx Diameter session using an Authorization/Authentication Request (AAR) command at operation 205. After the PCRF1 obtains session information from the database at operation 206, the AF receives user information as part of the AA-Answer (AAA) from the PCRF at operation 207. The PCRF1 also sends a Gx Re-Auth-Request (RAR) command to the PGW at operation 208 and receives a Gx Ru-Auth-Answer (RAA) from the PGW at operation 209. In the 5G networks, the AF sends a request to the PCF1 over the N5 interface at operation 205. After the PCF1 access information from the database at operation 206, the AF receives a response from the PCF1 at operation 207. The PCF1 also sends a notification to the SMF over the N7 interface at operation 208 and receives an N7 acknowledgement from the SMF at operation 209.

Figure 3:
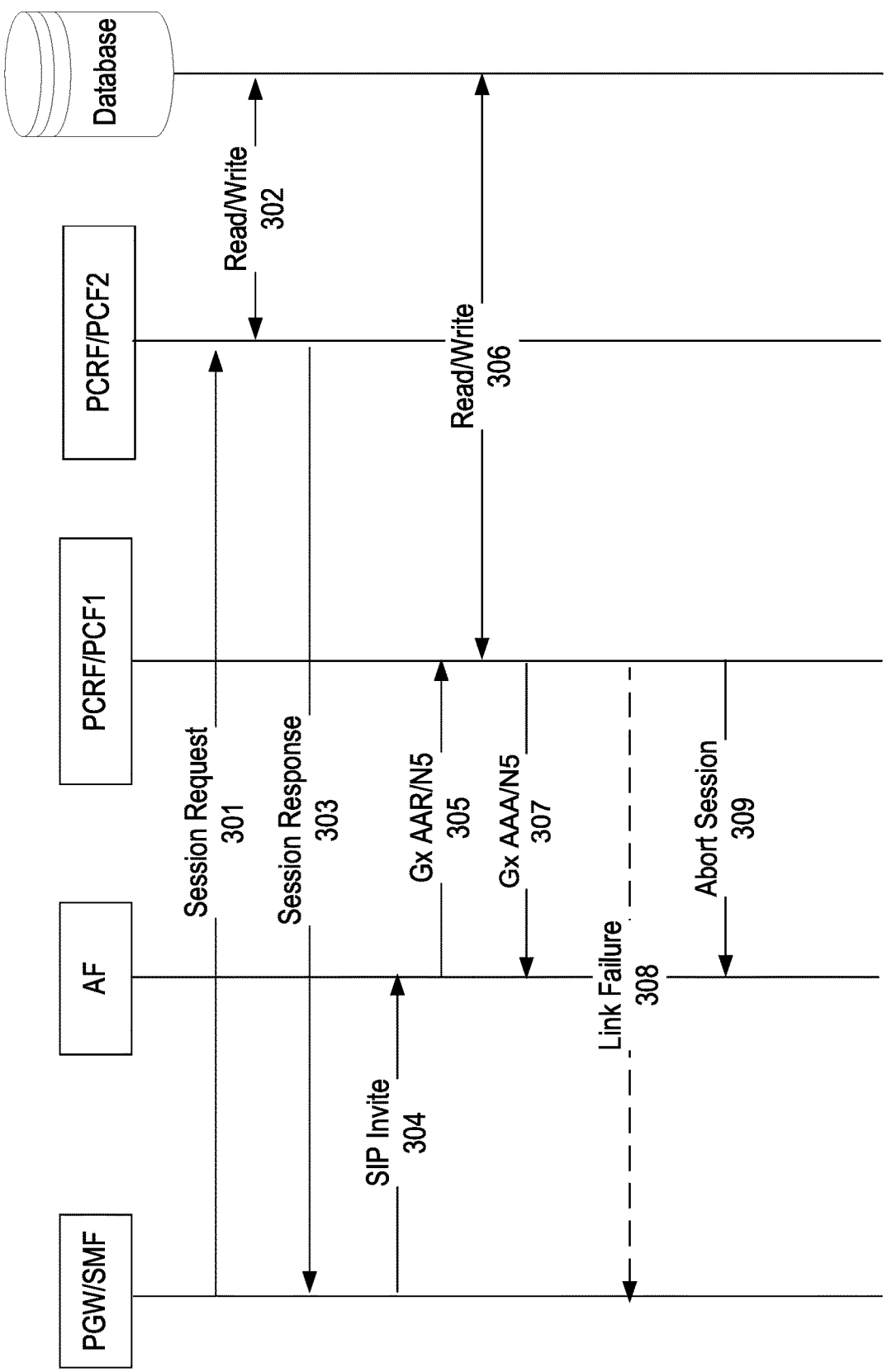
FIG. 3 illustrates an example call flow when a failure occurs using a redundant deployment of the PCRF/PCF.

Currently, when a failure occurs at one of the PCRF/PCF sites, the user needs to reinitiate the session. FIG. 3 illustrates an example call flow when a failure occurs using a redundant deployment of the PCRF/PCF. Operations 301-307 are similar to operations 201-207 depicted in FIG. 2. At operation 308, the PCRF/PCF1 encounters a failure and cannot send the Gx RAR command or N7 notification to the PGW/SMF. At this point, the PCRF/PCF1 sends a message to the AF to abort the session at operation 309. Aborting the session requires the user to retry with another SIP invite message (e.g., operation 304) after a period of time (e.g., three seconds). Thus, the call session cannot be established until operations 205-209 as shown in FIG. 2 are performed successfully after the retry, leading to an extensive delay of about six to nine seconds for the call. This can greatly impact user experience during call establishment. This problem is further exacerbated when multiple failures occur.

To avoid the excessive delay in failure handling of SIP call session establishment, this patent document discloses techniques that can be implemented in various embodiments to eliminate the need to reinitiate the session from the beginning. In some embodiments, the PCRF/PCF site that encounters a failure can transmit a notification to the AF indicating that there exists a temporary failure so that the AR can re-transmit the AAR or N7 notification to an alternative PCRF/PCF site. Consistent with the Third-Generation Partnership Project (3GPP) standard, when the PCRF/PCF encounters temporary failures that prevent it from transmitting RAR or N7 notification to the PGW/SMF, the PCRF/PCF can include a customized string in an RAR command to the AF to notify the AF of the temporary failure.

Figure 4A:
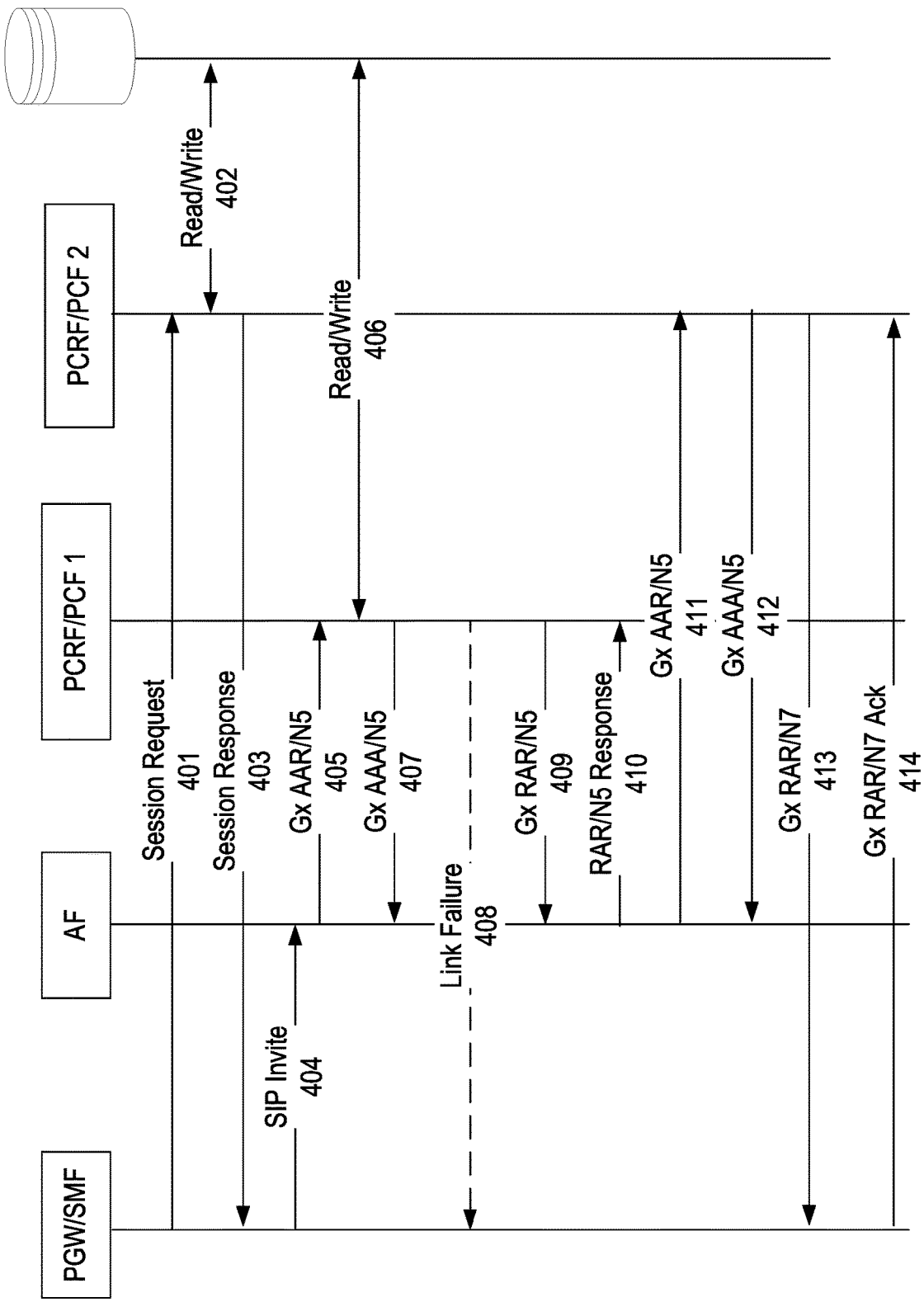
FIG. 4A illustrates an example call sequence in accordance with one or more embodiments of the present technology.

FIG. 4A illustrates an example call sequence in accordance with one or more embodiments of the present technology. Operations 401-407 are similar to operations 301-307 depicted in FIG. 3. In operation 408, the PCRF/PCF1 encounters a temporary failure and cannot send the Gx RAR command or N7 notification to the PGW/SMF. The PCRF/PCF1 then sends a message (e.g., an RAR command or an N5 notification) at operation 409 to another network node in the core network (e.g., the AF), notifying another entity or entities in the core network that there is a temporary failure. The message can carry a customized string indicating information about the temporary failure. The network node (e.g., AF) responds to the PCRF/PCF1 at operation 410. The network node (e.g., AF) can select a different PCRF/PCF server (e.g., PCRF/PCF2) to continue the session establishment in subsequent operations. For example, operations 205-209 as shown in FIG. 2 can be carried out between the network node and the newly selected PCRF/PCF server to complete the session establishment.

In some embodiments, as shown in FIG. 4A, the network node AF opens an Rx Diameter session at operation 411 using an AA-Request (AAR) command to the newly selected PCRF/PCF2. In this particular example, PCRF/PCF2 is aware of the session information because it has handled the initial session request and has the session information stored at its local memory/storage. In some embodiments, if the selected peer PCRF/PCF is not aware of the session information, it can query the shared database to retrieve such information and continue the establishment process. Upon the PCRF/PCF2 retrieving the session information, the AF receives user information as part of the AA-Answer (AAA) from the PCRF/PCF2 at operation 412. The PCRF/PCF2 also sends a notification (e.g., RAR or N7 notification) to the PGW/SMF operation 413 and receives a response (e.g., RAR or N7 acknowledgement) from the SMF at operation 414.

In some embodiments, the PCRF/PCF site that encounters a failure can transmit a message to a peer PCRF/PCF site directly, notifying that a failure has occurred. For example, based on the information shared among the PCRF/PCF sites, the PCRF/PCF that encounters the failure can select a peer node to take over the SIP session establishment process. In some embodiments, the PCRF/PCF node that handles the initial session request (e.g., PCRF/PCF2) can be selected. In some embodiments, selection of the PCRF/PCF node can be determined based on the traffic load that each PCRF/PCF node is handling to achieve optimal load balancing among the geo-redundantly deployed nodes. In some embodiments, any peer PCRF/PCF that can communicate with the PGW/SMF can be selected. Upon receiving the failure notification, the peer PCRF/PCF site can continue the session establishment process by transmitting a Gx RAR command or N7 notification message to the PGW/SMF.

Figure 4B:
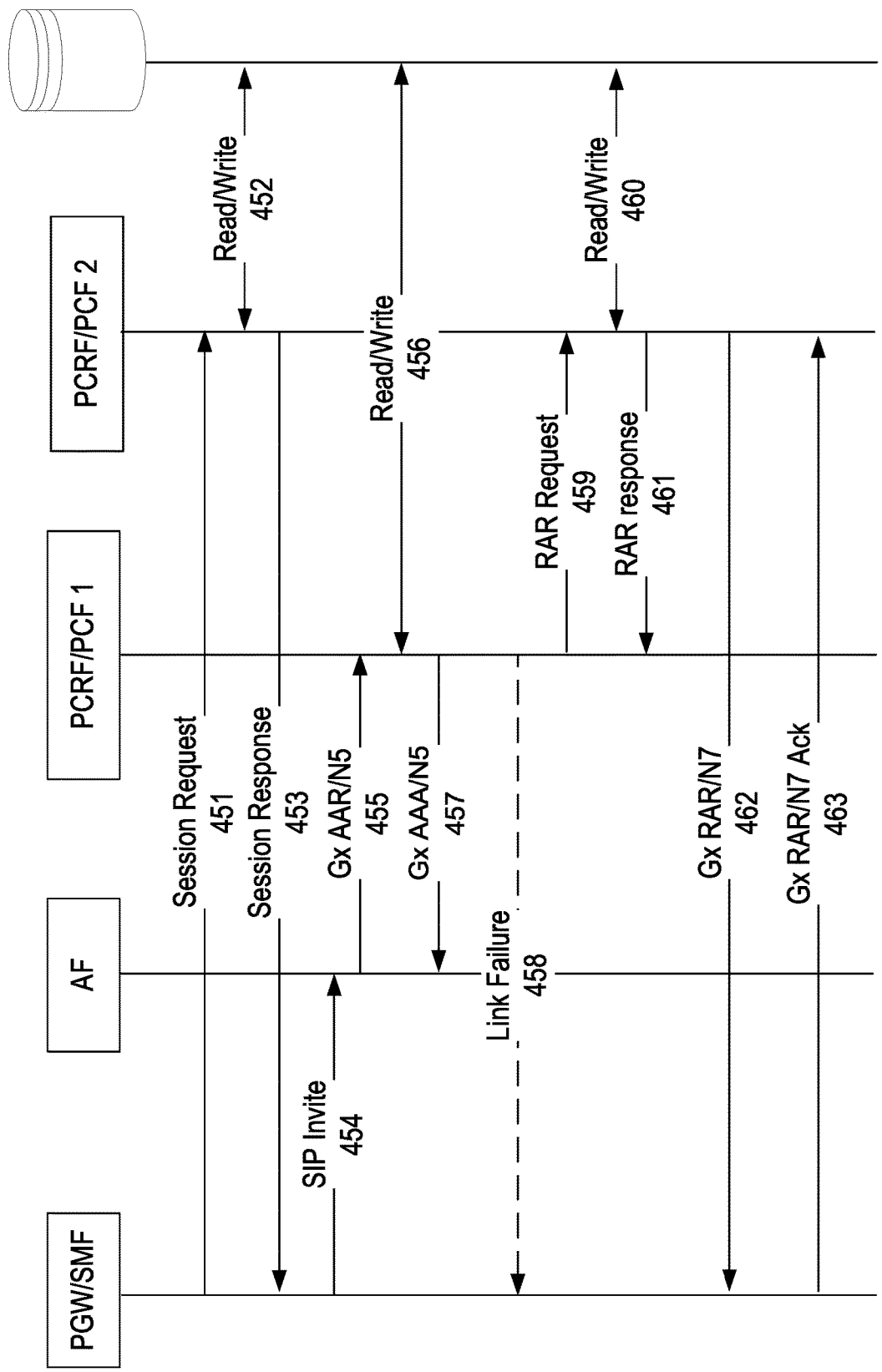
FIG. 4B illustrates another example call sequence in accordance with one or more embodiments of the present technology.

FIG. 4B illustrates another example call sequence in accordance with one or more embodiments of the present technology. Operations 451-457 are similar to operations 301-307 depicted in FIG. 3. In operation 408, the PCRF/PCF1 encounters a failure and cannot send the Gx RAR command or N7 notification to the PGW/SMF. The PCRF/PCF1 then sends a message (e.g., an RAR command or an N5 notification) at operation 459 to a peer PCRF/PCF (e.g., PCRF/PCF2) notifying the peer node that there is a failure. The message can carry a customized string indicating information about the failure. The PCRF/PCF2 retrieves user information from the database at operation 460 (if needed) and responds to the PCRF/PCF1 at operation 461 acknowledging that it has received the information and will continue the session establishment. The PCRF/PCF2 then sends a notification (e.g., RAR or N7 notification) to the PGW/SMF operation 462 and receives a response (e.g., RAR or N7 acknowledgement) from the PGW/SMF at operation 463.

In the examples shown in FIGS. 4A-4B, a customized string can be carried in the message from PCRF/PCF1 to the AF or the peer node PCRF/PCF2, indicating information about the failure to allow the peer node to continue the session establishment procedure without the need to reinitiate the session. In some embodiments, the customized string can be implemented as an Error-Message attribute-value pair (AVP). The Error-Message AVP is of type UTF8String and can be accompanied with a Result-Code AVP to provide a human-readable error message. An example of Error Message AVP is shown in Table 1 below, indicating that a temporary uplink (UL) or downlink (UL) link failure has been detected.

TABLE 1

AVP: Error-Message (281) l = 29 f = 0x00 val = Denied due to UL/DL failure
  AVP Code: 281 Error-Message
  AVP Flags: 0x00
  AVP Lengths: 29
  Error-Message: Denied due to UL/DL failure Other example messages that can be included in the Error-Message AVP include "Failure due to PCF-SMF resource issue" or "Link failure between PCRF-PWG." In some embodiments, other types of error messages (e.g., human-readable messages or predefined, non-readable messages) can be used.

Figure 5A:
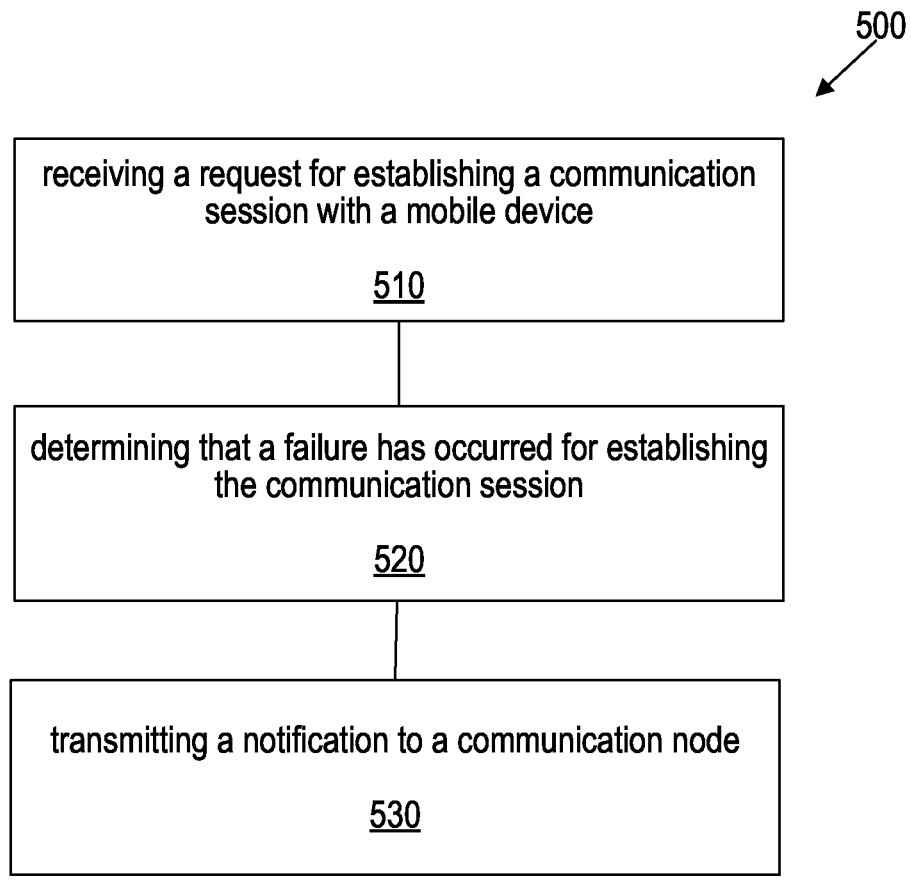
FIG. 5A is a flowchart representation of a method for wireless communication in accordance with one or more embodiments of the present technology.

FIG. 5A is a flowchart representation of a method 500 for wireless communication in accordance with one or more embodiments of the present technology. The method 500 includes, at operation 510, receiving, by a first communication node configured to provide policy control in a communication network (e.g., a PCRF/PCF node), a request for establishing a communication session with a mobile device. The first communication node can be one of the redundantly deployed PCRF/PCF nodes in the communication network—that is, it has one or more peer communication nodes deployed in the communication network to provide policy control. The request for establishing the communication session can be the Gx AAR or an N5 request from the AF.

The method 500 includes, at operation 520, determining, by the first communication node, that a failure has occurred between the first communication node and a second communication node for establishing the communication session.

The method 500 also includes, at operation 530, transmitting, by the first communication node, a notification to a third communication node. The notification comprises a customized message (e.g., an Error-Message AVP) indicating information about the failure to enable the third communication node to continue the establishing of the communication session with the mobile device. The third communication node can be the AF that selects a peer PCRF/PCF node (e.g., as shown in FIG. 4A) or the peer PCRF/PCF node selected by the first communication node (e.g., as shown in FIG. 4B). Based on the notification, the peer PCRF/PCF node can continue the session establishment without introducing the need for the user to reinitiate the session, thereby reducing or minimizing delays caused by the failure and ensuring reliable user experience for the users.

Figure 5B:
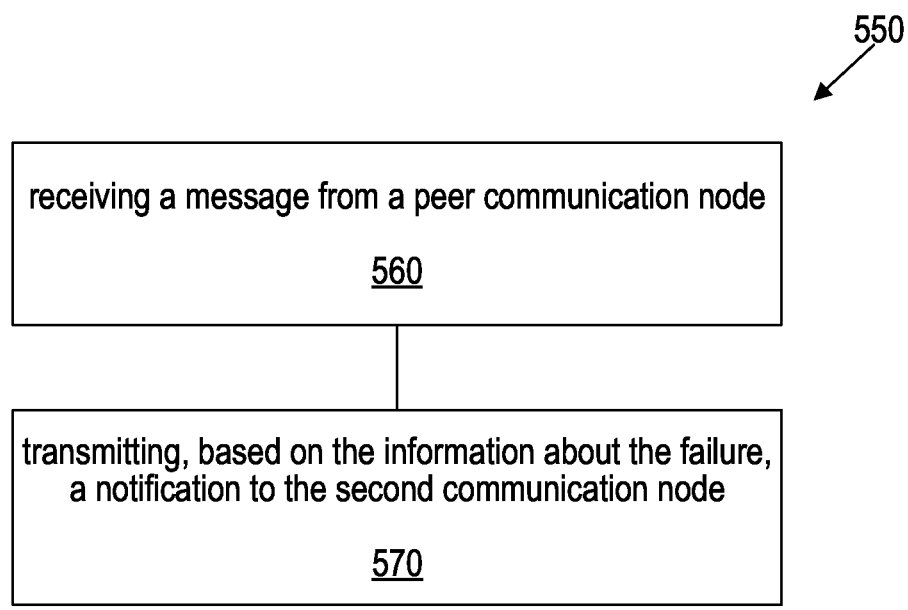
FIG. 5B is a flowchart representation of another method for wireless communication in accordance with one or more embodiments of the present technology.

FIG. 5B is a flowchart representation of another method 550 for wireless communication in accordance with one or more embodiments of the present technology. The method 550 includes, at operation 560, receiving, by a first communication node configured to provide policy control in a communication network (e.g., PCRF/PCF2), a first message from a peer communication node (e.g., PCRF/PCF1). The peer communication node is configured to provide policy control in the communication network and is geo-redundantly deployed with the first communication node. The message comprises a customized message indicating information about a failure has occurred between the peer communication node and a second communication node in the communication network for establishing a communication session with a mobile device. The method 550 also includes, at operation 570, transmitting, based on the information about the failure, a notification to the second communication node to continue the establishing of the communication session with the mobile device.

In some embodiments, the method includes retrieving, by the first communication node, information about the communication session by querying a database that is shared by the first communication node and the peer communication node. In some embodiments, the method includes transmitting, by the first communication node, a second message to the peer communication node acknowledging reception of the message. In some embodiments, the method includes receiving, by the first communication node, an acknowledgment from the second communication node to continue the establishing of the communication session with the mobile device.

In some embodiments, the second communication node comprises a Packet Data Network Gateway (PGW) or a Session Management Function (SMF). In some embodiments, the message comprises a Gx Re-Auth-Request (RAR) command.

Wireless Communications System

Figure 6:
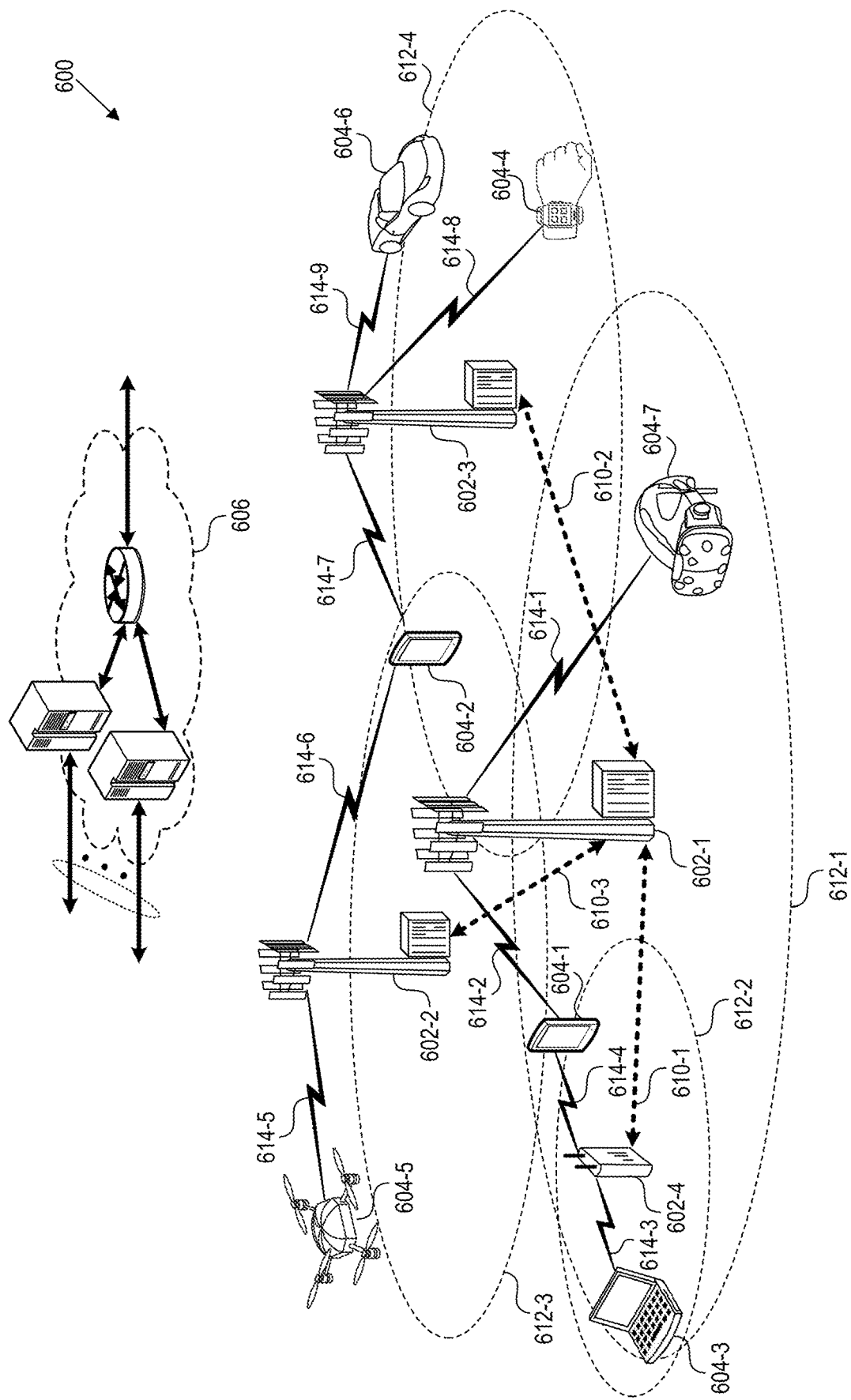
FIG. 6 is a diagram that illustrates a wireless telecommunication network in which aspects of the disclosed technology are incorporated.

FIG. 6 is a diagram that illustrates a wireless telecommunication network 600 ("network 600") in which aspects of the disclosed technology are incorporated. The network 600 includes base stations 602-1 through 602-4 (also referred to individually as "base station 602" or collectively as "base stations 602"). A base station is a type of network access node (NAN) that can also be referred to as a cell site, a base transceiver station, or a radio base station. The network 600 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 600 formed by the network 600 also include wireless devices 604-1 through 604-7 (referred to individually as "wireless device 604" or collectively as "wireless devices 604") and a core network 606. The wireless devices 604-1 through 604-7 can correspond to or include network 600 entities capable of communication using various connectivity standards. For example, a 5G communication channel can use millimeter wave (mmW) access frequencies of 28 GHz or more. In some implementations, the wireless device 604 can operatively couple to a base station 602 over a long-term evolution/long-term evolution-advanced (LTE/LTE-A) communication channel, which is referred to as a 4G communication channel.

The core network 606 provides, manages, and controls security services, user authentication, access authorization, tracking, Internet Protocol (IP) connectivity, and other access, routing, or mobility functions. The base stations 602 interface with the core network 606 through a first set of backhaul links (e.g., S1 interfaces) and can perform radio configuration and scheduling for communication with the wireless devices 604 or can operate under the control of a base station controller (not shown). In some examples, the base stations 602 can communicate with each other, either directly or indirectly (e.g., through the core network 606), over a second set of backhaul links 610-1 through 610-3 (e.g., X1 interfaces), which can be wired or wireless communication links.

The base stations 602 can wirelessly communicate with the wireless devices 604 via one or more base station antennas. The cell sites can provide communication coverage for geographic coverage areas 612-1 through 612-4 (also referred to individually as "coverage area 612" or collectively as "coverage areas 612"). The geographic coverage area 612 for a base station 602 can be divided into sectors making up only a portion of the coverage area (not shown). The network 600 can include base stations of different types (e.g., macro and/or small cell base stations). In some implementations, there can be overlapping geographic coverage areas 612 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 600 can include a 5G network 600 and/or an LTE/LTE-A or other network. In an LTE/LTE-A network, the term eNB is used to describe the base stations 602, and in 5G new radio (NR) networks, the term gNBs is used to describe the base stations 602 that can include mmW communications. The network 600 can thus form a heterogeneous network 600 in which different types of base stations provide coverage for various geographic regions. For example, each base station 602 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 600 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 600 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 600 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 604 and the base stations 602 or core network 606 supporting radio bearers for the user plane data. At the Physical (PHY) layer, the transport channels are mapped to physical channels.

Wireless devices can be integrated with or embedded in other devices. As illustrated, the wireless devices 604 are distributed throughout the system 600, where each wireless device 604 can be stationary or mobile. For example, wireless devices can include handheld mobile devices 604-1 and 604-2 (e.g., smartphones, portable hotspots, tablets, etc.); laptops 604-3; wearables 604-4; drones 604-5; vehicles with wireless connectivity 604-6; head-mounted displays with wireless augmented reality/virtual reality (AR/VR) connectivity 604-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 604-1, 604-2, 604-3, 604-4, 604-5, 604-6, and 604-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 600 equipment at the edge of a network 600 including macro eNBs/gNBs, small cell eNBs/gNBs, relay base stations, and the like. A wireless device can also communicate with other wireless devices either within or outside the same coverage area of a base station via device-to-device (D2D) communications.

The communication links 614-1 through 614-9 (also referred to individually as "communication link 614" or collectively as "communication links 614") shown in network 600 include uplink (UL) transmissions from a wireless device 604 to a base station 602, and/or downlink (DL) transmissions from a base station 602 to a wireless device 604. The downlink transmissions can also be called forward link transmissions while the uplink transmissions can also be called reverse link transmissions. Each communication link 614 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 614 can transmit bidirectional communications using frequency division duplex (FDD) (e.g., using paired spectrum resources) or Time division duplex (TDD) operation (e.g., using unpaired spectrum resources). In some implementations, the communication links 614 include LTE and/or mmW communication links.

In some implementations of the network 600, the base stations 602 and/or the wireless devices 604 include multiple antennas for employing antenna diversity schemes to improve communication quality and reliability between base stations 602 and wireless devices 604. Additionally or alternatively, the base stations 602 and/or the wireless devices 604 can employ multiple-input, multiple-output (MIMO) techniques that can take advantage of multi-path environments to transmit multiple spatial layers carrying the same or different coded data.

Computer System

Figure 7:
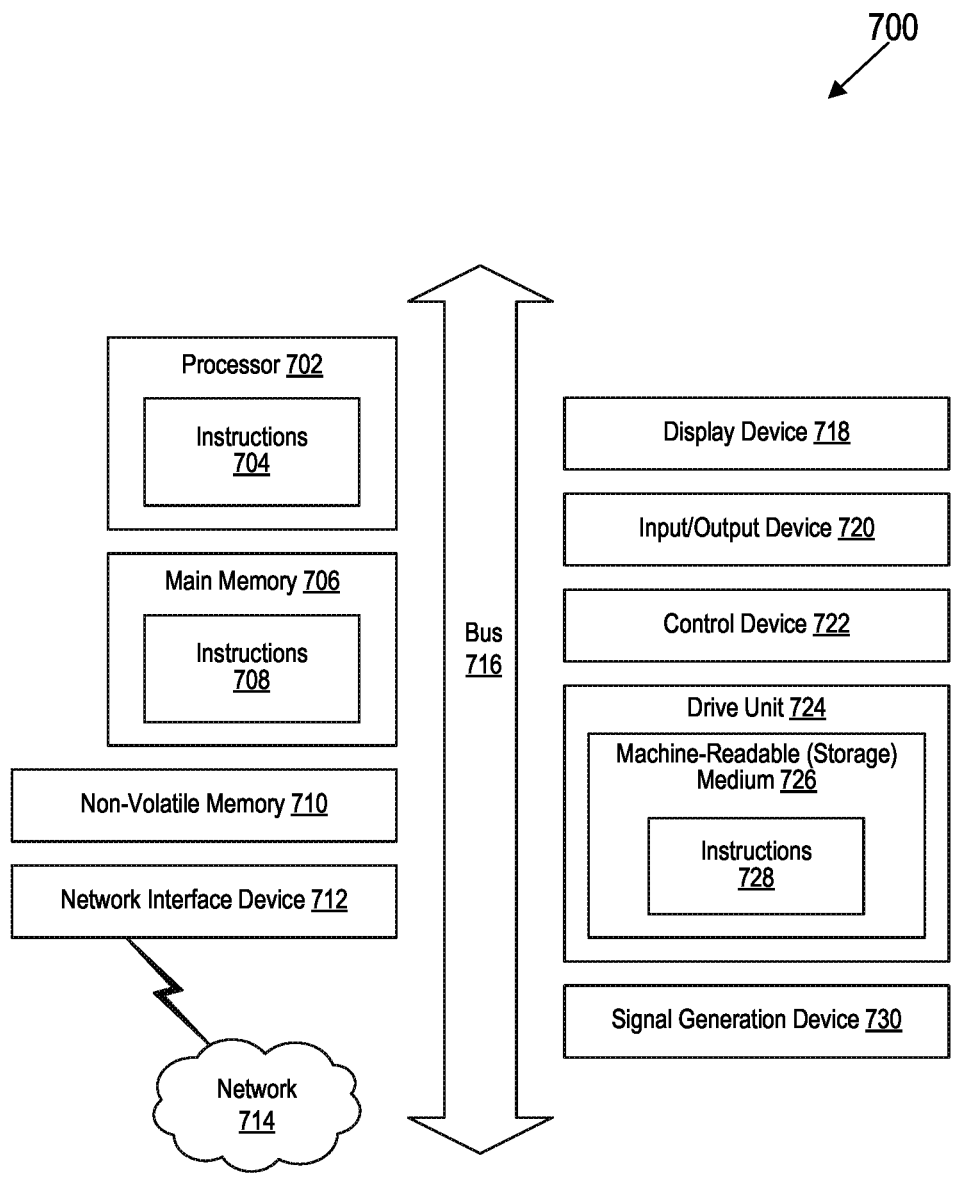
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A method for wireless communication, comprising:
receiving, by a first Policy and Charging Rules Function (PCRF) or a first Policy Control Function (PCF) communication node configured to provide policy control in a communication network, a request from a Packet Data Network Gateway (PGW) or a Session Management Function (SMF) node for establishing a communication session with a mobile device, determining, by the first PCRF or the first PCF communication node, that a failure to establish the communication session has occurred between the first PCRF or the first PCF communication node and the PGW or the SMF, wherein the communication network further includes one or more peer PCRF or one or more peer PCF communication nodes of the first PCRF or the first PCF communication node redundantly deployed in the communication network, wherein each of the one or more peer PCRF or the one or more peer PCF communication nodes is in communication with the PGW or the SMF node; and upon determining that the failure to establish the communication session has occurred, transmitting, by the first PCRF or the first PCF communication node, a notification to a peer PCRF or a peer PCF communication node that is separated from the first PCRF or the first PCF communication node, wherein the notification comprises a customized message indicating information about the failure to enable the peer PCRF or the peer PCF communication node to continue the establishing of the communication session with the mobile device, wherein the customized message is included in an Error-Message attribute-value pair (AVP).

2. The method of claim 1, wherein the request for establishing the communication session with the mobile device comprises an Authorization/Authentication Request (AAR) or a request message transmitted via an N5 interface.

3. The method of claim 1, wherein the customized message comprises information about a cause for the failure to establish the communication session.

4. The method of claim 1, wherein the notification comprises a Gx Re-Auth-Request (RAR) command.

5. The method of claim 1, comprising: receiving, by the first PCRF or the first PCF communication node, a response from the peer PCRF or the peer PCF communication node acknowledging to continue the establishing of the communication session with the mobile device by the peer PCRF or the peer PCF communication node.

6. The method of claim 1, wherein the communication network comprises at least one of a Long Term Evolution (LTE) network or a New Radio (NR) network.

7. A device for wireless communication implemented as a Policy and Charging Rules Function (PCRF) or a Policy Control Function (PCF) communication node configured to provide policy control in a communication network, comprising at least one processor that is configured to: receive a request from a Packet Data Network Gateway (PGW) or a Session Management Function (SMF) node for establishing a communication session with a user equipment; determine that a failure to establish the communication session has occurred between the device and the PGW or the SMF node, wherein the communication network further includes one or more peer PCRF or one or more peer PCF communication nodes of the device redundantly deployed in the communication network, wherein each of the one or more peer PCRF or the one or more PCF communication nodes is in communication with the PGW or the SMF node, and wherein the device and the one or more peer PCRF or the one or more PCF communication nodes are connected to a shared database; and upon determining that the failure to establish the communication session has occurred, transmit a notification to a peer PCRF or a peer PCF communication node that is separated from the PCRF or the PCF communication node, wherein the notification comprises a customized message indicating information about the failure to enable the peer PCRF or the peer PCF communication node to continue the establishing of the communication session with the user equipment, wherein the customized message is included in an Error-Message attribute-value pair (AVP).

8. The device of claim 7, wherein the at least one processor is configured to receive an Authorization/Authentication Request (AAR) or a request message transmitted via an N5 interface as the request for establishing the communication session with the user equipment.

9. The device of claim 7, wherein the customized message comprises information about a cause for the failure to establish the communication session.

10. The device of claim 7, wherein the notification comprises a Gx Re-Auth-Request (RAR) command.

11. The device of claim 7, wherein the at least one processor is configured to: receive a response from the peer PCRF or the peer PCF communication node acknowledging to continue the establishing of the communication session with the user equipment by the peer PCRF or the peer PCF communication node.

12. The device of claim 7, wherein the communication network comprises at least one of a Long Term Evolution (LTE) network or a New Radio (NR) network.

13. A method for wireless communication, comprising:
receiving, by a first Policy and Charging Rules Function (PCRF) or a first Policy Control Function (PCF) communication node configured to provide policy control in a communication network, a first message from a peer PCRF or a peer PCF communication node that is separated from the first PCRF or the first PCF communication node, wherein the peer PCRF or the peer PCF communication node is configured to provide policy control in the communication network and is geo-redundantly deployed with the first PCRF or the first PCF communication node, wherein the first PCRF or the first PCF communication node is in communication with a Packet Data Network Gateway (PGW) or a Session Management Function (SMF) node, wherein the peer PCRF or the peer PCF communication node is in communication with the PGW or the SMF node, wherein the first message comprises a customized message indicating information about a failure has occurred between the peer PCRF or the peer PCF communication node and the PGW or the SMF node in the communication network for establishing a communication session with a mobile device; and transmitting, based on the information about the failure, a notification to the PGW or the SMF node to continue the establishing of the communication session with the mobile device, wherein the notification comprises a customized message that is included in an Error-Message attribute-value pair (AVP).

14. The method of claim 13, further comprising:
retrieving, by the first PCRF or the first PCF communication node, information about the communication session by querying a database that is shared by the first PCRF or the first PCF communication node and the peer PCRF or the peer PCF communication node.

15. The method of claim 13, further comprising:
transmitting, by the first PCRF or the first PCF communication node, a second message to the peer PCRF or the peer PCF communication node acknowledging reception of the first message.

16. The method of claim 13, further comprising:
receiving, by the first PCRF or the first PCF communication node, an acknowledgment from the PGW or the SMF node to continue the establishing of the communication session with the mobile device.

17. The method of claim 13, wherein the first message comprises a Gx Re-Auth-Request (RAR) command.

18. The method of claim 13, wherein the communication network comprises at least one of a Long Term Evolution (LTE) network or a New Radio (NR) network.

\* \* \* \* \*